Nov. 18, 1947.    G. B. HAAS    2,430,873
PACKING AND SEALING STRIP FOR PANEL MEMBERS
Filed July 27, 1944
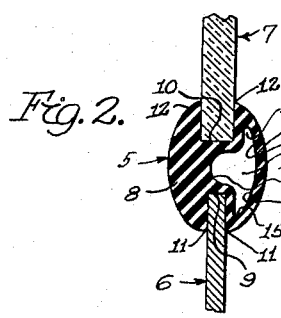
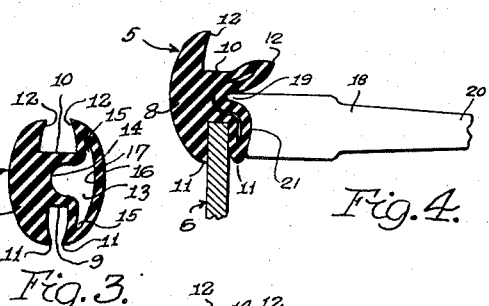
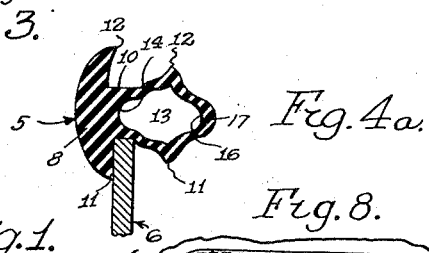
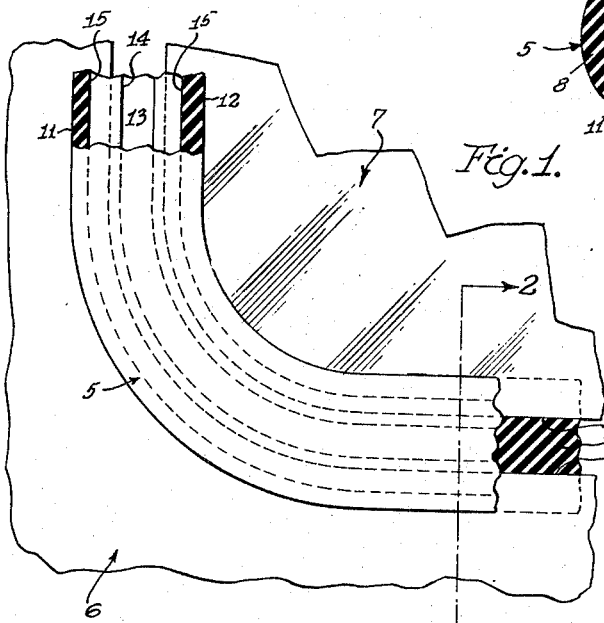
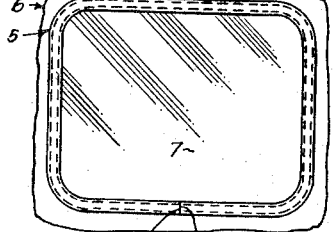
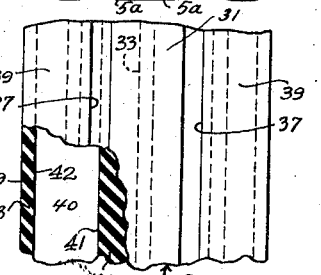
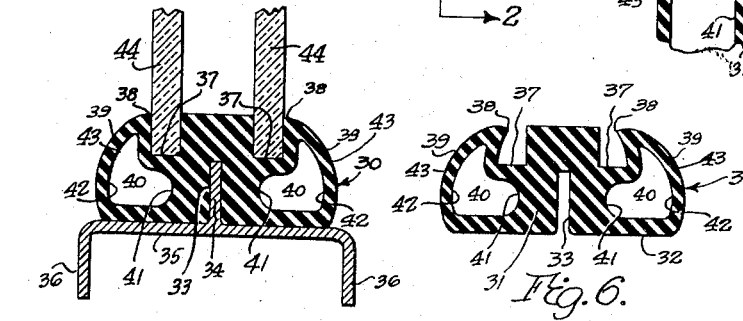
Inventor
Glenn B. Haas
By Barthel & Bugbee
Attorneys Patented Nov. 18, 1947

2,430,873

UNITED STATES PATENT OFFICE 2,430,873

PACKING AND SEALING STRIP FOR PANEL MEMBERS

Glenn B. Haas, Grosse Pointe Park, Mich.

Application July 27, 1944, Serial No. 546,857

3 Claims. (Cl. 20—56.4)

1

The present invention relates to improvements in flexible waterproofing, sealing and glazing strips intended for use in connection with glass panels on motor vehicles and the like.

The primary object of the invention is to provide a flexible packing and sealing strip which may be easily and readily deformed to facilitate the insertion of the glass panel and to enhance the appearance of the completed window panel structure when the sealing strip and glass panel are mounted in an opening.

Another object of the invention is to provide a sealing and packing strip having a flexible body portion provided with panel receiving grooves and having a longitudinally extending opening so arranged and positioned as to facilitate the deforming of one of the sealing lips of the sealing strip for insertion of the glass panel and yet form a semi-rigid support for the glass panel when the sealing lip has been released to assume its normal position.

Another object of the invention is to provide a packing and sealing strip of the above mentioned type in which said longitudinal opening or passageway may be inflated by fluid under pressure to cause said sealing strip to be deformed in such a manner as to permit the insertion of the glass panel with considerable ease and a reduction of time.

Another object of the invention is to provide a packing and sealing strip of the above-mentioned type in which said longitudinal opening or passageway may be evacuated by creating suction to cause said sealing strip to be deformed in such a manner as to permit the insertion of the glass panel with considerable ease and a reduction of time.

Another object of the invention is to provide a sealing and packing strip of the above-mentioned type in which a portion of the side of the strip may be compressed so as to occupy the space formed by the longitudinal opening and thereby deform the sealing strip in such a manner as to facilitate the quick and easy installation of the glass or other panel in position within an opening, such as the window opening in another panel member to waterproof the joint therebetween.

Another object of the invention is to provide a packing and sealing strip which may be deformed from its normal position by causing a portion thereof to be flexed in such a manner as to receive a panel member and to form said sealing and packing strip so that the deformed portion will return to its normal positions after being flexed

2 into tight sealing engagement with a panel member without materially weakening the supporting characteristics of the sealing strip.

Other objects and advantages of the invention will become apparent during the course of the following description of the accompanying drawing, wherein:

Figure 1 is a front elevational view of the packing strip showing a preferred embodiment thereof and illustrating portions thereof broken away to show the manner in which the packing strip is interposed between adjacent panel members;

Figure 2 is a transverse cross sectional view taken on line 2—2 of Figure 1 looking in the direction of the arrows showing the opening or passageway in the body portion of the sealing strip and the general cross sectional contour of the strip when in its normal position with the panel members connected thereby;

Figure 3 is a transverse cross sectional view similar to Figure 2 with the panel members removed and illustrating the relative positions of the sealing lips when the panels are displaced;

Figure 4 is a transverse cross sectional view of the packing and sealing strip showing the manner in which one of the sealing lips may be deformed by a compression tool;

Figure 4a is a cross sectional view of the packing and sealing strip showing the manner of inflating said strip to cause the deformation of the sealing lips for facilitating the installation of panel members;

Figure 5 is a transverse cross sectional view of a modified form of the invention illustrating a sealing strip for accommodating parallel panel members;

Figure 6 is a transverse cross sectional view of the sealing and packing strip shown in Figure 5 with the panel members removed; and Figure 7 is a fragmentary top elevational view of the sealing strip shown in Figures 5 and 6 illustrating a portion thereof in section to indicate the longitudinally extending opening at one side thereof.

Figure 8 is a reduced-size, front elevational view of an entire window installation, including the corner portion thereof shown in Figures 1 and 2, after the glass panel has been inserted in the sealing strip.

In the drawing Figures 1 to 4a inclusive show a packing or sealing strip 5 constructed in accordance with the present invention for being received in an opening of the panel 6 so as to support a glass window panel or the like as at 7 in such a manner as to weather-proof and waterproof the joint between.

The sealing strip 5 comprises a body portion 8 which is elliptical in cross section and is provided with opposed longitudinal slots 9 and 10 for receiving the edge of the panel 6 and window panel 7 respectively. The inner walls of the longitudinal grooves 9 and 10 are slightly curved so that the edges will be slightly overturned as at 11 and 12 to form gripping and sealing lips for engaging the side surfaces of the panels 6 and 7. As shown in Figure 3, the sealing strip 5 is formed and extruded from rubber or other resilient material so that the lips 11 and 12 will normally assume the position shown in Figure 3 so that they will be placed under tension when the panels 6 and 7 are arranged with their edges in the slots 9 and 10 as shown in Figure 2.

Extending longitudinally of the sealing packing strip 5 is an opening or passageway 13 having a portion 14 cut away between the panels 6 and 7 and said opening 13 is enlarged as at 15 to form a crescent-shaped portion having an arcuately curved interior wall 16 of substantially the same cross sectional contour as the elliptical body portion 8, thus forming an arcuately curved wall portion 17 extending between the lips 11 and 12 which, in its normal position, as shown in Figures 2 and 3, is strengthened against lateral stresses or compression.

It is intended to deform the arcuately curved wall 17 as shown in Figure 4 during the installation of the glass panel 7 by means of a tool or the like as at 18 having a pointed portion 19 for engaging the central portion of the wall 17 and depressing and flexing said wall so as to force the same into the central portion 14 of the opening 13. The tool 18 is provided with a handle 20 to facilitate the manipulation thereof and said tool is provided with a curved portion 21 conforming in shape to the curvature between the central portion 14 of the opening and the enlarged portion 14 thereof (Figure 4). As the arcuately curved wall 17 is forced into said opening 13, one of the lips 12 will be flexed in the direction and position shown in Figure 4 so as to facilitate the insertion of the glass pane or panel 7. When the tool 18 is released, the sealing lip 12 assumes its normal position as shown in Figure 2 so as to grip the pane or panel 7 under a slight tension by reason of the fact that the lips 12 are directed inwardly and normally formed in this manner. It will thus be seen that the lips 12 will be held slightly spaced when the pane or panel 7 is inserted as shown in Figure 2 so as to place the arcuately curved wall 17 under a slight compression which is sufficient to cause said lip to remain in position and prevent the lateral displacement of the glass pane or panel 7.

As shown in Figure 4a, the sealing strip 5 has been deformed by inflating the longitudinally extending passageway 13 by subjecting the same to air under pressure by any conventional device, such inflating devices being well known as, for example, for inflating footballs, basketballs and the like. When the sealing strip is deformed as shown in Figure 4a, the arcuately curved wall 17 is flexed to withdraw one of each of the sealing lips 11 and 12 from the normal position shown in Figure 3 so that the glass pane or panel 7 may be easily inserted into the groove 10 without the use of clamping or holding devices which has heretofore been the usual custom.

When the glass pane 7 is inserted and the longitudinal passageway or opening 13 is deflated in a reverse manner to inflation, by any conventional device as previously mentioned, said sealing strip will assume a position shown in Figure 2 so as to cause the lips 12 to contactually engage the glass panel 7 and seal the joint between the panel member 6 and pane 7.

If the longitudinal opening 13 is evacuated as by means of creating a suction therein, the sealing strip will be deformed in a manner similar to the showing in Figure 4 and the inner wall 16 will be deformed so as to assume a position within the extruded portion of the opening as at 14.

Thus, after the glass panel has been inserted in the groove 10 of the sealing strip 5, the sealing lip 12 is caused to return to its normal sealing position shown in Figures 1 and 2, either by withdrawing the tool 18 of Figure 4 or admitting air to break the vacuum in the passageway 13 of Figure 4, or by releasing compressed air from the passageway 13 of Figure 4a. The window installation as a whole then appears as shown in Figure 8.

During installation, the open ends of the passageway 13 in the sealing strip 5 may be closed and made airtight by cementing or vulcanizing the opposite ends of the sealing strip 5 where they abut one another, as shown at 5a in Figure 8. It has also been found feasible to close the passageway 13 sufficiently for the purposes of the present invention merely by cutting the sealing strip to a length in excess of its required length, for example about one quarter inch longer than necessary. When this excessively long sealing strip 5 is forced into the panel opening, the ends 5a are compressed together by the resilience of the sealing strip 5, sealing the joint between them.

In the form of the invention shown in Figures 5 to 7 inclusive, the sealing strip 30 is formed by extruding rubber or other suitable material to the desired shape so as to provide a body portion 31 having a bottom wall 32 provided with a central slot 33 for receiving a rib 34 on a frame member or the like as at 35. The frame member 35 may form the channel portion of a window opening and is provided with downwardly extending flanges 36 as shown in Figure 5.

The body portion 31 of the sealing strip is provided with a pair of window pane receiving grooves 37 arranged in parallel spaced relation and said grooves have inwardly directed walls providing sealing lip portions 38 similar to the sealing lip portions 11 and 12 of the packing and sealing strips shown in Figures 1 to 4a inclusive. The side walls 39 of the sealing strip are arcuately curved in cross section and the body portion 31 of the sealing strip is provided with longitudinally extending openings or passageways 40 having opposed interior curved walls 41 and 42. The interior curved walls 42 are shaped to coincide with the side walls 39 so as to form an arcuately curved wall portion 43 as shown clearly in Figure 6.

The arcuately curved wall portions 43 are similar to the curved wall portion 17 and are adapted to be flexed for the purpose of inserting parallel window panels or panes 44 with their edges disposed in the grooves 37 as shown in Figure 5. When the window panels or panes 44 are inserted, the arcuately curved walls 43 are flexed by means of a tool as shown in Figure 4 to force the curved wall 43 into the curved portion 41 of the opening or passageway 40 or by inflating the openings or passageways 40 as shown in Figure 4a to cause the walls 43 to be flexed and deformed to an extended position whereupon the lips 38 will be disposed out of the path of the panes or panels 44 to permit the easy insertion thereof.

In both forms of the invention, the arcuately curved walls 17 and 43 assume a curved normal position and cause the sealing lips 12 and 38 to contactually engage the glass panels and seal the same against the entrance of moisture as well as weather conditions. It will thus be seen that the arcuately curved walls 17 and 43, when in their unflexed or normal position, exert a force on the sealing lips 11, 12 and 38 without requiring the use of interlocking strips or other devices for accomplishing this purpose.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A packing and sealing strip, comprising an elongated body portion of elastic deformable material having a groove for receiving the edge of a panel member, said body portion being permanently shaped in cross-section and with a resilient groove wall to normally engage and frictionally grip the edge of said panel member, and said body portion being provided with a longitudinally extending air-tight opening forming an elongated closed air chamber disposed adjacent said groove wall to permit flexing of said groove wall to cause deformation of said groove and facilitate insertion of said panel member whereby said panel will be frictionally held in said groove when the body portion is restored to its normal permanent cross sectional shape in response to the restorative force exerted thereon by the air pressure in said air chamber.

2. A packing and sealing strip for weatherproofing the joint between the adjacent edges of a pair of panel members, comprising an elongated body portion formed of rubber having a permanently shaped cross section, said body portion being formed with oppositely disposed longitudinally extending grooves for receiving the adjacent edges of panel members, and said body portion being provided with a longitudinally extending opening having a reduced portion extending between said grooves and an enlarged portion forming an arcuately curved wall portion adapted to be deformed into said opening to distort said grooves and facilitate the insertion and removal of said panel members.

3. A packing and sealing strip for weatherproofing the joint between the adjacent edges of a pair of panel members, comprising an elongated body portion formed of rubber having a permanently shaped cross section, said body portion being formed with oppositely disposed longitudinally extending grooves for receiving the adjacent edges of panel members, and said body portion being provided with a longitudinally extending opening having a reduced portion extending between said grooves and an enlarged portion forming an arcuately curved wall portion adapted to be deformed into said opening to distort said grooves and facilitate the insertion and removal of said panel members, said grooves being formed with inwardly directed walls to normally engage and frictionally grip the edges of said panel members.

GLENN B. HAAS.

REFERENCES CITED

The following references are of record in the file of this patent:

UNITED STATES PATENTS

| Number | Name | Date |
|---|---|---|
| 2,288,329 | Smith | June 30, 1942 |
| 2,189,138 | Eichner | Feb. 6, 1940 |
| 2,189,137 | Eichner | Feb. 6, 1940 |

FOREIGN PATENTS

| Number | Country | Date |
|---|---|---|
| 135,391 | Germany | Oct. 29, 1902 |